Feb. 28, 1967  C. F. BASTLE  3,306,321
SOLENOID ACTUATED THREE-WAY VALVES
Filed June 19, 1964
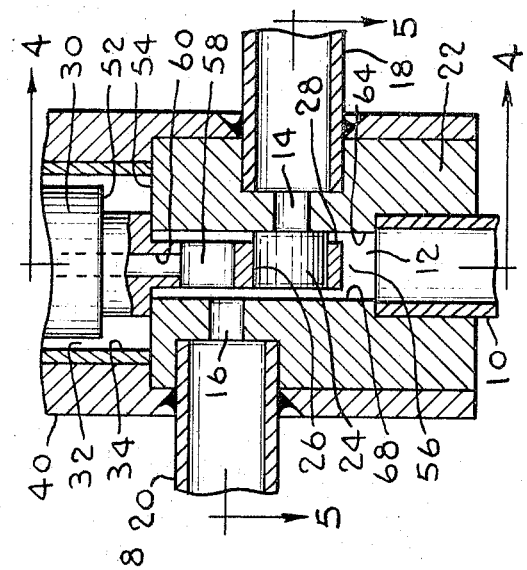
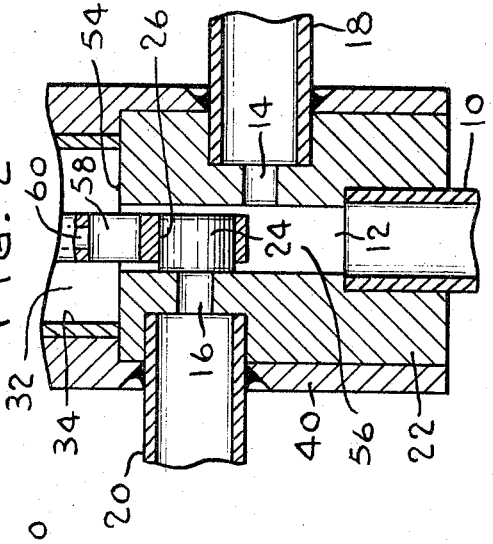
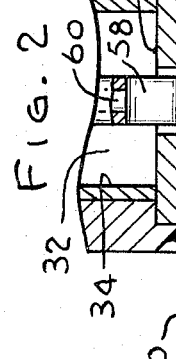
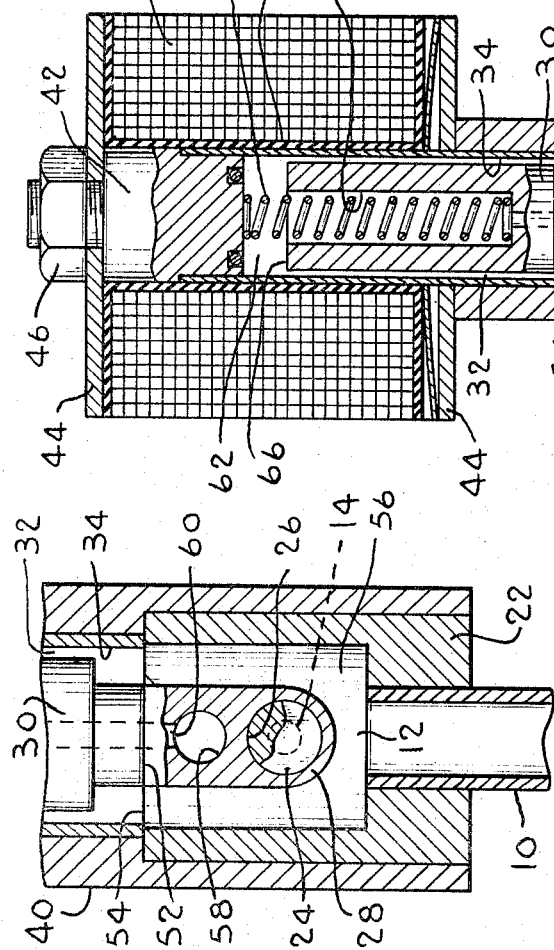
INVENTOR
CLIFFORD F. BASTLE
By Bayard H. Michael
ATTORNEY

United States Patent Office 3,306,321
Patented Feb. 28, 1967

3,306,321
SOLENOID ACTUATED THREE-WAY VALVES
Clifford F. Bastle, Milwaukee, Wis., assignor to Controls Company of America, Melrose Park, Ill., a corporation of Delaware
Filed June 19, 1964, Ser. No. 376,445
3 Claims. (Cl. 137—625.48)

This invention pertains to improvements in solenoid actuated three-way valves of the type having an inlet and two separate outlets and having a valve member which is held in sealing engagement with either of the outlets by virtue of the pressure of the fluid passing through the valve, the valve element being movable between said outlets by a spring biased plunger of a solenoid.

The principal object of this invention is to reduce the plunger stroke which is required to move the valve element from a closing position of one of the outlets to a closing position of the other of the outlets to thereby either reduce the coil size of a particular capacity valve or to increase the pressure handling ability of a given solenoid actuated valve of this type.

This object is attained by providing the outlets on opposite sides of the valve chamber and in close proximity of each other when measured along the path of the plunger travel. By virtue of this structure, the required plunger travel between a closing position of one outlet and a closing position of the other outlet is reduced to its minimum, especially when compared to a structure in which the openings are positioned on the same side of the valve chamber. In the valve embodying the present invention the outlet farthest removed from the solenoid coil is opened in response to energization of the coil, which causes the plunger to be moved into the coil, and thereby to move the valve to a position in alignment with the second outlet (closer to solenoid coil than the first). The valve closes the second outlet during energization of the coil. Upon deenergization of the coil the plunger is biased outwardly by a spring to the first mentioned position.

The maximum load of the solenoid is experienced when the outlet furthest removed from the solenoid coil is opened, at which time the initial opening force has to be sufficient to break the seal between the valve member and an associated valve seat as well as to overcome the internal hydraulic resistances normally opposing the plunger movement. After the initial opening movement the force and load requirements are substantially smaller. Since the initial opening force is primarily dependent upon the pressure exerted on the valve member by the fluid handled by the valve, it can be said the pressure handling capacity of such valve is determined by the maximum load handling capacity of the solenoid, i.e. its coil size.

The present invention permits one to maintain the initial coil size yet to increase the load handling capacity of the solenoid solely by providing a valve housing and outlet design, which reduces the plunger stroke below that thought necessary heretofore, and thereby increases the maximum force which the solenoid is capable of providing at the time of the initial opening of the valve.

Other objects and advantages will be pointed out in, or be apparent from, the specification and claims, as will obvious modifications of the single embodiment shown in the drawings, in which:

FIG. 1 is a cross-sectional side view of the valve embodying the present invention;

FIG. 2 is an enlarged fragmentary view of the valve housing showing the valve in a position closing the outlet opening furthest from the solenoid coil;

FIG. 3 is a view similar to that of FIG. 2 but showing the valve in a position closing the other outlet opening;

FIG. 4 is a cross-sectional view taken on line 4—4 of FIG. 2 with part of the valve plug being broken away to show its retaining aperture; and FIG. 5 is a cross-sectional view taken on line 5—5 of FIG. 2.

Referring to the drawings in detail, the valve embodying the present invention is connected to a fluid supply conduit 10 at inlet 12 and is adapted to selectively close outlets 14 or 16 which are in communication with conduits 18 and 20 respectively. The outlets 14 and 16 are provided on opposite sides of valve seat block 22. The inlet is shown to be on the bottom of the valve seat block to thereby form a T-type valve structure; however, the particular location of the outlet is not thought to be of a particular signficance in this invention.

A resilient valve plug 24 is slidably mounted in valve retaining aperture 26 of the nose portion 28 of the plunger 30. The plunger is mounted for reciprocal motion in passage 32 defined by line 34, which projects partly into the bobbin 36 of the coil 38, and partly into the valve housing 40. One end of passage 32 is closed by plug 42 which is secured to one of the coil end pieces 44 by unit 46. When the coil is deenergized compression spring 48, retained in bore 50 of the plunger and engaged with plug 42 biases the plunger outwardly from the coil to a position in which shoulder 52 of the plunger engages face 54 of the block. In this position valve plug 24 is in an axially aligned position with outlet 14, as shown in FIG. 1.

With the parts as shown in FIG. 1, an initial supply of fluid through inlet 12 will cause fluid under pressure to flow into the central valve chamber 56, to flow through the bores 58, 60 and 50 into space 62 at the inward end of the plunger, and to flow through outlet 16. At such time the valve plug 24 is a slight distance removed from face 64 of the valve block and therefore restricts fuel flow through outlet 14. Because of the restriction, the pressure on the unrestricted side of the plug (left side in FIG. 5) is greater than on the side facing face 64 therefore causing the plug to slide in aperture 26 and to be pressed in a sealing engagement with face 64 to close outlet 14. During operation of the valve the fluid from inlet 10 flows directly to outlet 16, the initial fluid flow in the passage 32 being merely provided to attain a favorable hydraulic balance of the plunger.

When it is desired to open outlet 14 and close outlet 16, the coil is energized thereby causing plunger 30 to travel inwardly in opposition to the bias of the spring and to move to a position in which the face 66 of the plunger engages the plug 42. In this position the valve plug is axially aligned with outlet 16.

In this position the fluid pressure causes the valve plug to slide from the position shown in FIG. 2 to that in FIG. 3 thereby causing the plug to sealingly engage the face 68 of the valve seat block and to close outlet 16. At this point it should be noted that both faces 68 and 64 are flat and parallel sidewalls of an elongated passage and therefore are fairly easy to machine as well as provide easy seating of the plug.

Although but a single embodiment of the present invention has been illustrated and described, it will be apparent to those skilled in the art that various changes and modifications may be made therein without departing from the spirit of the invention or from the scope of the appended claims.

What is claimed is:
1. A solenoid actuated three-way valve comprising,
   a valve housing defining a central valve chamber,
   valve seat means having two opposing faces each provided with an outlet opening,
   a solenoid including a coil, a plunger, and spring means which biases the plunger to an outward position in respect to said coil when said coil is deenergized, said plunger being moved into said coil when said coil is energized, valve means movably mounted in said plunger, the outlet opening on one of said faces being located thereon in a position to be aligned with said valve means when said plunger is in said outward position, and the outlet opening on the other of said faces being located thereon in a position to be aligned with said valve means when said plunger is moved into said coil, said valve means moving against the face containing the outlet opening with which said valve means is aligned to thereby seal such outlet opening in response to the flow of fluid through said inlet opening; said valve means comprising a resilient plug mounted for slidable motion in said plunger, said motion being substantially perpendicular to the direction of travel of said plunger.

2. A valve according to claim 1 wherein said faces are substantially flat and parallel to each other.

3. A solenoid actuated three-way valve comprising, a valve housing defining a central valve chamber having an inlet opening and having two outlet openings located on opposite sides of said chamber, a solenoid including a coil and a spring biased plunger movable to an outward position in respect to the coil when the coil is deenergized and inward in respect thereto when the coil is energized, a resilient valve plug retained on said plunger and movable with said plunger to be axially aligned with one of said outlets when said coil is deenergized and to be aligned with the other of said outlets when said coil is energized, said valve plug being movably mounted in respect to said plunger to thereby permit fluid pressure within said chamber to move said valve in sealing position in respect to said outlet with which said valve has been axially aligned.

References Cited by the Examiner

UNITED STATES PATENTS

| | | | |
|---|---|---|---|
| 2,041,002 | 5/1936 | Kreuzer et al. | 137—625.48 |
| 2,601,280 | 6/1952 | Hays | 137—625.65 |
| 2,723,681 | 11/1955 | MacGlashan et al. | 137—625.65 |
| 2,750,962 | 6/1956 | Kreitchman et al. | 137—625.48 |
| 2,828,937 | 4/1958 | Kreitchman | 251—175 X |

M. CARY NELSON, *Primary Examiner.*

E. K. FEIN, *Assistant Examiner.*